(12) United States Patent
Ono

(10) Patent No.: US 11,327,569 B2
(45) Date of Patent: May 10, 2022

(54) TACTILE SENSATION PRESENTATION DEVICE AND TACTILE SENSATION PRESENTATION METHOD

(71) Applicant: KABUSHIKI KAISHA TOKAI RIKA DENKI SEISAKUSHO, Aichi (JP)

(72) Inventor: Yasuhiro Ono, Aichi (JP)

(73) Assignee: KABUSHIKI KAISHA TOKAI RIKA DENKI SEISAKUSHO, Aichi (JP)

(*) Notice: Subject to any disclaimer, the term of this patent is extended or adjusted under 35 U.S.C. 154(b) by 0 days.

(21) Appl. No.: 17/273,160

(22) PCT Filed: Aug. 20, 2019

(86) PCT No.: PCT/JP2019/032481
§ 371 (c)(1),
(2) Date: Mar. 3, 2021

(87) PCT Pub. No.: WO2020/054332
PCT Pub. Date: Mar. 19, 2020

(65) Prior Publication Data
US 2021/0342005 A1 Nov. 4, 2021

(30) Foreign Application Priority Data
Sep. 12, 2018 (JP) .............................. JP2018-170533

(51) Int. Cl.
*G06F 3/048* (2013.01)
*G06F 3/01* (2006.01)
(Continued)

(52) U.S. Cl.
CPC .............. *G06F 3/016* (2013.01); *B60K 35/00* (2013.01); *G06F 3/0482* (2013.01);
(Continued)

(58) Field of Classification Search
CPC ...... G06F 3/016; G06F 3/0482; G06F 3/0488; G06F 3/018; G06F 3/0237;
(Continued)

(56) References Cited

U.S. PATENT DOCUMENTS 10,437,359 B1\* 10/2019 Wang ....................... G06F 3/016
2012/0256858 A1\* 10/2012 Sudo ........................ G06F 3/018
345/173
(Continued)

FOREIGN PATENT DOCUMENTS

| JP | 2006-079238 | 3/2006 |
|---|---|---|
| JP | 2006-185380 | 7/2006 |

(Continued)

OTHER PUBLICATIONS

International Search Report issued in International Patent Application No. PCT/JP2019/032481, dated Nov. 12, 2019.
(Continued)

*Primary Examiner* — Aleksey Olshannikov
(74) *Attorney, Agent, or Firm* — Greenblum & Bernstein, P.L.C.

(57) ABSTRACT

A tactile sensation presentation device includes a display unit that displays plural images on a display screen, an operating portion including an operation surface on which a touch operation is performed to select one of the plural images displayed on the display unit, a vibration presentation unit that presents tactile sensation by vibrating the operation surface according to the touch operation, and a control unit that extracts at least one candidate image, which has a probability of being selected next after a selected image selected on the operation surface, from the plural images displayed on the display screen, predicts a next selected image to be selected next from the candidate image(s) based on a trajectory, on the display screen, of a
(Continued)

tracing operation as the touch operation performed on the operation surface, and presents tactile sensation by the vibration presentation unit when reaching the next selected image.

9 Claims, 6 Drawing Sheets

(51) Int. Cl.
    *B60K 35/00*     (2006.01)
    *G06F 3/0482*     (2013.01)
    *G06F 3/0488*     (2022.01)

(52) U.S. Cl.
    CPC ...... *G06F 3/0488* (2013.01); *B60K 2370/143* (2019.05); *B60K 2370/152* (2019.05); *B60K 2370/158* (2019.05)

(58) Field of Classification Search
    CPC ................ G06F 3/04186; B60K 35/00; B60K 2370/143; B60K 2370/152; B60K 2370/158
    See application file for complete search history.

(56) References Cited

U.S. PATENT DOCUMENTS

| | | | |
|---|---|---|---|
| 2013/0038537 A1* | 2/2013 | Nishii | G06F 40/274 345/168 |
| 2014/0237356 A1* | 8/2014 | Durga | G06F 3/0233 715/256 |
| 2014/0359515 A1 | 12/2014 | Medlock et al. | |
| 2017/0168681 A1* | 6/2017 | Agger | G06F 3/04842 |

FOREIGN PATENT DOCUMENTS

JP      2015-503807      2/2015
JP      2016-057856      4/2016

OTHER PUBLICATIONS

Written Opinion of the International Searching Authority issued in International Patent Application No. PCT/JP2019/032481, dated Nov. 12, 2019.

* cited by examiner

FIG. 3A

| CANDIDATE IMAGE | FREQUENCY (%) |
|---|---|
| Na (FuNaBaShi) | 40 |
| Ku (FuKuShiMa) | 30 |
| Chi (FuChiU) | 20 |
| Ra (FuRaNo) | 10 |

FIG. 3B

| Wa | Ra | Ya | Ma | Ha | Na | Ta | Sa | Ka | A |
|---|---|---|---|---|---|---|---|---|---|
| Wo | Ri | Yu | Mi | Hi | Ni | Chi | Shi | Ki | I |
| N | Ru | Yo | Mu | Fu | Nu | Tsu | Su | Ku | U |
| | Re | " | Me | | Ne | Te | Se | Ke | E |
| | Ro | . | Mo | | No | To | So | Ko | O |

FIG. 3C

| Wa | Ra | Ya | Ma | Ha | Na | Ta | Sa | Ka | A |
|---|---|---|---|---|---|---|---|---|---|
| Wo | Ri | Yu | Mi | Hi | Ni | Chi | Shi | Ki | I |
| N | Ru | Yo | Mu | Fu | Nu | Tsu | Su | Ku | U |
| | Re | " | Me | | Ne | Te | Se | Ke | E |
| | Ro | . | Mo | | No | To | So | Ko | O |

TACTILE SENSATION PRESENTATION DEVICE AND TACTILE SENSATION PRESENTATION METHOD

CROSS-REFERENCES TO RELATED APPLICATIONS

The present patent application claims the priority of Japanese patent application No. 2018/170533 filed on Sep. 12, 2018, and the entire contents of Japanese patent application No. 2018/170533 are hereby incorporated by reference.

The present invention relates to a tactile sensation presentation device and a tactile sensation presentation method.

BACKGROUND ART

A touch panel device is known which is provided with a vibrating element for vibrating a touch panel, a touch position detection unit for detecting a touch position on the touch panel surface, and a vibration control unit that causes the vibrating element to vibrate at a vibration frequency, vibration intervals, or a vibration intensity corresponding to the touch position (see, e.g., Patent Literature 1).

This touch panel device is configured that vibration gradually increases according to the touch positions when tracing on the touch panel surface upward from the bottom and vibration gradually decreases according to the touch positions when tracing on the touch panel downward from the top.

CITATION LIST

Patent Literature

Patent Literature 1: JP 2006/79238 A

SUMMARY OF INVENTION

Technical Problem

When quickly tracing on the touch panel surface of the touch panel device disclosed in Patent Literature 1, vibration is presented at short intervals and a user may feel annoyed.

It is an object of the invention to provide a tactile sensation presentation device and a tactile sensation presentation method that can suppress annoyance.

Solution to Problem

According to an embodiment of the invention, a tactile sensation presentation device, comprises:
- a display unit that displays a plurality of images on a display screen;
- an operating portion comprising an operation surface on which a touch operation is performed to select one of the plurality of images displayed on the display unit;
- a vibration presentation unit that presents tactile sensation by vibrating the operation surface according to the touch operation; and
- a control unit that extracts at least one candidate image, which has a probability of being selected next after a selected image selected on the operation surface, from the plurality of images displayed on the display screen, predicts a next selected image to be selected next from the candidate image(s) based on a trajectory, on the display screen, of a tracing operation as the touch operation performed on the operation surface, and does not present tactile sensation by the vibration presentation unit even when the trajectory crosses a boundary line acting as a trigger for presenting tactile sensation if it is between the selected image and the next selected image, and presents tactile sensation by the vibration presentation unit when reaching the next selected image.

According to another embodiment of the invention, a tactile sensation presentation method comprises:
- extracting at least one candidate image, which has a probability of being selected next after a selected image, from a plurality of images displayed on a display screen;
- predicting a next selected image to be selected next from the candidate image(s) based on a trajectory, on the display screen, of a tracing operation performed on an operation surface; and
- not presenting tactile sensation even when the trajectory crosses a boundary line acting as a trigger for presenting tactile sensation if it is between the selected image and the next selected image, and presenting tactile sensation when reaching the next selected image.

Advantageous Effects of Invention

According to one embodiment and another embodiment of the invention, it is possible to provide a tactile sensation presentation device and a tactile sensation presentation method that can suppress annoyance.

BRIEF DESCRIPTION OF DRAWINGS

FIG. 3A is an explanatory diagram for explaining frequency information held on the tactile sensation presentation device in the first embodiment.

FIG. 3B is an explanatory diagram illustrating images of fifty-sounds displayed on the display unit of the tactile sensation presentation device in the first embodiment.

FIG. 3C is an explanatory diagram for explaining a selected image selected from the images of fifty –sounds displayed on the display unit of the tactile sensation presentation device in the first embodiment.

DESCRIPTION OF EMBODIMENTS

Summary of the Embodiment

A tactile sensation presentation device in the embodiments has a control unit that extracts at least one candidate image, which has a probability of being selected next after a selected image, from plural images displayed on a display screen, predicts a next selected image to be selected next from the candidate image(s) based on a trajectory, on the display screen, of a tracing operation performed on an operation surface, and does not present tactile sensation even when the trajectory crosses a boundary line acting as a trigger for presenting tactile sensation if it is between the selected image and the next selected image, and presents tactile sensation when reaching the next selected image.

This tactile sensation presentation device 1 does not present tactile sensation when a boundary line acting as a trigger for presenting tactile sensation is present between the selected image and the next selected image. Therefore, tactile sensation is not continuously presented and it is thereby possible to suppress annoyance, as compared to when presenting tactile sensation each time the trajectory crosses the boundary line.

First Embodiment (General Configuration of a Tactile Sensation Presentation Device 1)

The tactile sensation presentation device 1 in the first embodiment will be described below in reference to each drawing. In each drawing of the embodiment described below, a scale ratio may be different from an actual ratio. In addition, in FIGS. 1B and 1C, flows of main signals and information are indicated by arrows.

Figure 1A:
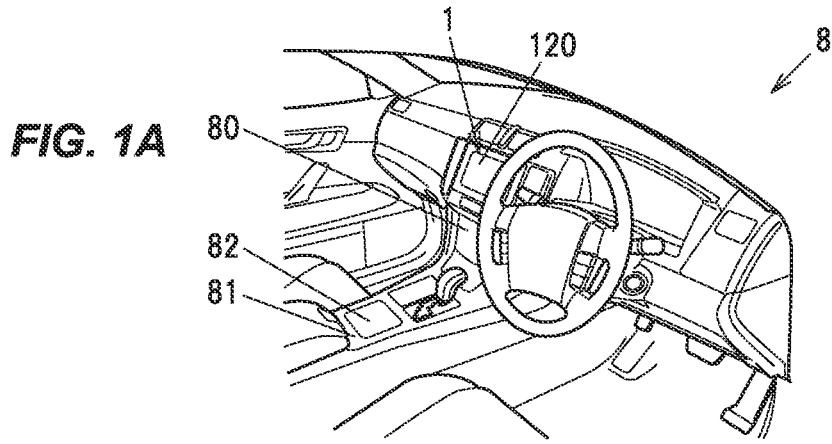
FIG. 1A is an explanatory diagram illustrating the inside of a vehicle in which a tactile sensation presentation device in the first embodiment is arranged.
Figure 1B:
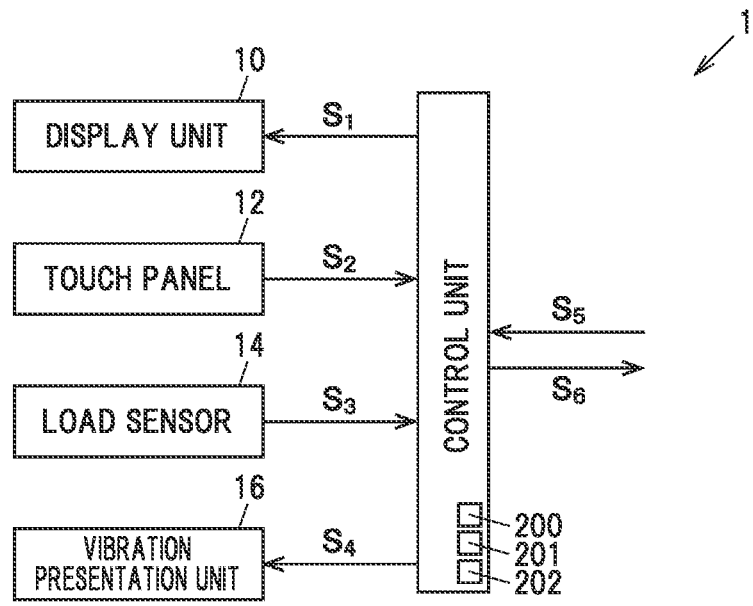
FIG. 1B is a block diagram illustrating the tactile sensation presentation device in the first embodiment.

As shown in FIG. 1A, the tactile sensation presentation device 1 is mounted on a vehicle 8 as an example, but it is not limited thereto. The tactile sensation presentation device 1 has, e.g., a display unit 10, a touch panel 12, a load sensor 14, a vibration presentation unit 16 and a control unit 18, as shown in FIG. 1B.

Figure 2A:
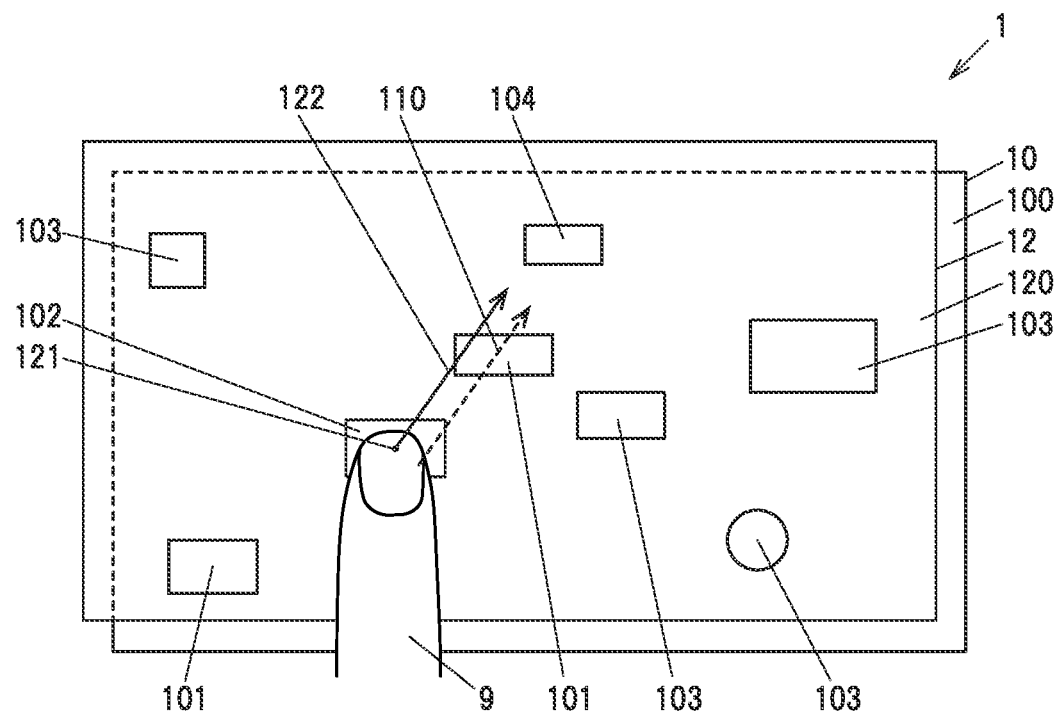
FIG. 2A is an explanatory diagram illustrating a display unit and a touch panel of the tactile sensation presentation device in the first embodiment.
Figure 2B:
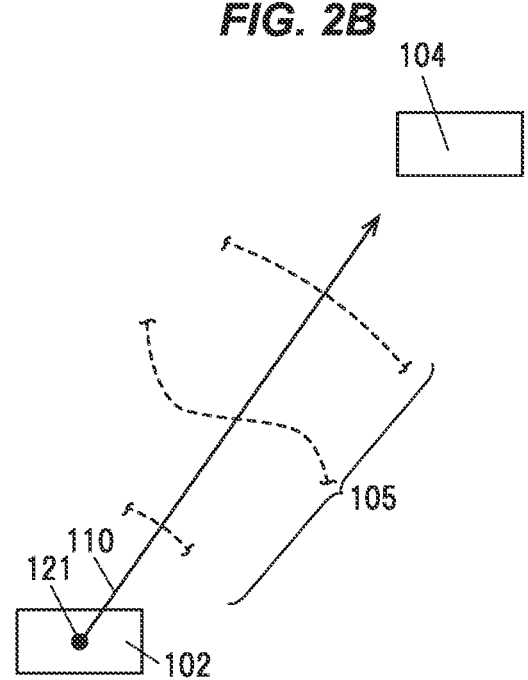
FIG. 2B is an explanatory diagram for explaining a boundary line acting as a trigger for presenting tactile sensation in the tactile sensation presentation device in the first embodiment.

The control unit 18 is configured to, e.g., extract at least one candidate image 103, which has a probability of being selected next after a selected image 102, from plural images 101 displayed on a display screen 100, predict a next selected image 104 to be selected next from the candidate image(s) 103 based on a trajectory 110, on the display screen 100, of a tracing operation performed on an operation surface 120, does not present tactile sensation even when the trajectory 110 crosses a boundary line 105 acting as a trigger for presenting tactile sensation if it is between the selected image 102 and the next selected image 104, and presents tactile sensation when reaching the next selected image 104, as shown in FIGS. 2A and 2B.

Possible trajectories include, e.g., a trajectory of an operating finger 9 tracing on the operation surface 120, a trajectory 122 (solid line) of a detection point 121 of the operating finger 9 detected by the touch panel 12, and a trajectory 110 (dotted line) obtained by adapting the trajectory 122 to the display screen 100, as shown in FIG. 2A. Tactile sensation is presented as, e.g., feedback to the operation on the image 101 displayed on the display screen 100. Thus, the trajectory here mainly indicates the trajectory 110.

Meanwhile, the images 101 are images displayed on the display screen 100. The selected image 102 is an image push-operated by the operating finger 9. The candidate image 103 is an image that has a probability of being selected next after the selected image 102. The next selected image 104 is an image predicted to be selected based on the trajectory 110 of the operating finger 9.

The boundary line 105 is a line set to trigger presentation of tactile sensation when the trajectory 110 intersects therewith. The control unit 18 presents tactile sensation, e.g., each time the trajectory 110 intersects with the boundary line 105, as shown in FIG. 2B. The boundary line 105 is a line dividing an area, a line defining an outer shape of the image 101, or a line surrounding the image 101 and provided for presenting tactile sensation just before the trajectory 110 reaches the image 101, etc.

The control unit 18 in the first embodiment is configured to, e.g., not present tactile sensation even when the trajectory 110 intersects with the boundary line 105 or the image 101 if the boundary line 105 or the image 101 is present between the selected image 102 and the next selected image 104, as shown in FIGS. 2A and 2B.

Figure 1C:
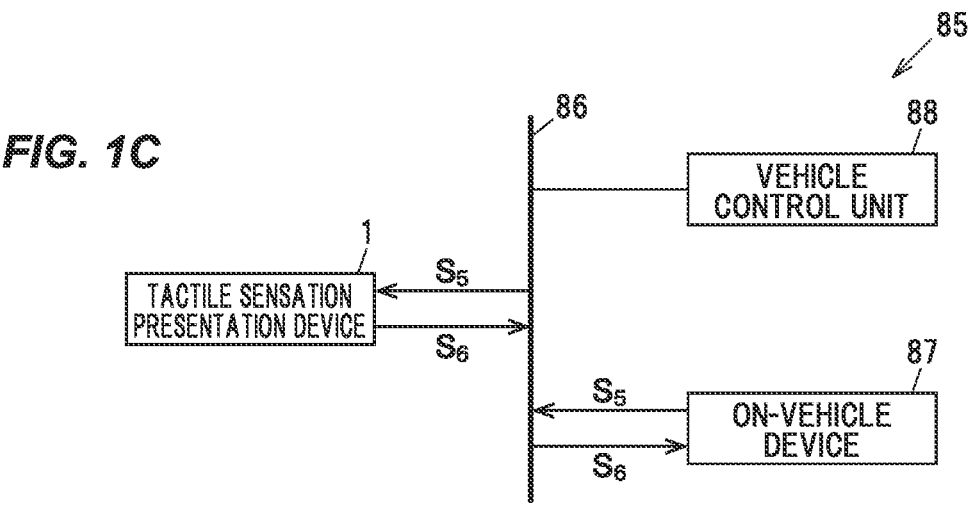
FIG. 1C is a block diagram illustrating a tactile sensation presentation system in which the tactile sensation presentation device in the first embodiment constitutes a part thereof.

The display unit 10 and the touch panel 12 of the tactile sensation presentation device 1 serve as, e.g., a display unit and an operation input unit of an electronic device mounted on the vehicle 8. Thus, the tactile sensation presentation device 1 constitutes, e.g., a part of a tactile sensation presentation system 85 of the vehicle 8, as shown in FIG. 1C. The tactile sensation presentation system 85 has the tactile sensation presentation device 1, an in-vehicle LAN (Local Area Network) 86, an on-vehicle device 87 and a vehicle control unit 88, as an example.

The in-vehicle LAN 86 is, e.g., an in-vehicle network such as CAN (Controller Area Network), LIN (Local Interface Interconnect Network), and CXPI (Clock Extension Peripheral Interface) that enables reciprocal exchange of signals or information with wire or wireless.

The on-vehicle device 87 is, e.g., a navigation device, an air conditioner, a music and image reproduction device, etc. The tactile sensation presentation device 1 displays, e.g., an image requested by the on-vehicle device 87 on the display screen 100 based on display image information $S_5$ output from the on-vehicle device 87. In addition, the tactile sensation presentation device 1 generates, e.g., input operation information $S_6$ based on an input operation received on the touch panel 12 and outputs it to the on-vehicle device 87.

The vehicle control unit 88 is, e.g., a microcomputer composed of a CPU (Central Processing Unit) performing calculation and processing, etc., of the acquired data according to a stored program, and a RAM (Random Access Memory) and a ROM (Read Only Memory) as semiconductor memories, etc. The vehicle control unit 88 comprehensively controls, e.g., the in-vehicle LAN 86, etc.

(Configuration of the Display Unit 10)

The display unit 10 is arranged on, e.g., a center console 80 of the vehicle 8, as shown in FIG. 1A. The display unit 10 is, e.g., a liquid crystal monitor. The display unit 10 displays an image on the display screen 100 based on, e.g., a display control signal $S_1$ output from the control unit 18. The control unit 18 generates the display control signal $S_1$ based on, e.g., the display image information $S_5$ acquired from the on-vehicle device 87 and an operation performed via the touch panel 12, etc.

(Configuration of the Touch Panel 12)

The touch panel 12 is, e.g., superimposed on the display unit 10, as shown in FIG. 2A. That is, a user can operate the touch panel 12 with a sense of directly touching and operating the display screen 100 of the display unit 10.

As a modification, the tactile sensation presentation device 1 may be configured such that, e.g., a touchpad 82 arranged at a position distant from the display unit 10 is used in place of or in combination with the touch panel 12 to perform an input operation, as shown in FIG. 1A. The touchpad 82 is, e.g., a capacitive touchpad and is arranged on a floor console 81 located between the driver's seat and the front passenger seat.

The touch panel 12 is, e.g., to detect a position on the operation surface 120 touched by a part of the user's body (e.g., the operating finger) or a dedicated pen. The user can perform, e.g., an input operation to the on-vehicle device 87 by performing an operation on the operation surface 120. As the touch panel 12, it is possible to use, e.g., a touch panel of resistive type, infrared type, or capacitive type, etc. The touch panel 12 in the first embodiment is a capacitive touch panel, as an example.

The touch panel 12 has, e.g., plural drive electrodes and plural detection electrodes that intersect under the operation surface 120 while maintaining insulation therebetween. The drive electrodes and the detection electrodes are transparent electrodes using ITO (Indium Tin Oxide), etc.

The touch panel 12 scans all combinations of the plural drive electrodes and the plural detection electrodes to read capacitance of each combination, and outputs as capacitance information $S_2$ to the control unit 18.

Based on the capacitance information $S_2$ and a touch threshold value 200 and from capacitance of not less than the touch threshold value 200, the control unit 18 calculates the detection point 121 at which a detection target is detected. The calculation of the detection point 121 is performed using, e.g., a weighted average.

(Configuration of the Load Sensor 14)

The load sensor 14 is arranged on, e.g., a back surface of the display unit 10 or the touch panel 12, and detects a load applied to the touch panel 12 when the user performs an operation. The load sensor 14 may be formed in, e.g., a sheet shape and arranged between the display unit 10 and the touch panel 12. The load sensor 14 is, e.g., a sensor using a piezoelectric body or a resistive film, etc. The load sensor 14 in the first embodiment is constructed from a strain gauge having a resistive film.

The load sensor 14 outputs, e.g., load information $S_3$, which is information of detected load, to the control unit 18. When the load based on the load information $S_3$ becomes not less than a load threshold value 201, the control unit 18 determines that the operation surface 120 is depressed, i.e., a push operation is performed.

(Configuration of the Vibration Presentation Unit 16)

The vibration presentation unit 16 is, e.g., a unimorph piezoelectric actuator provided with a metal sheet and a piezoelectric body. The unimorph piezoelectric actuator is an actuator having a structure to bend by only one piezoelectric body. As a modification, the vibration presentation unit 16 may be a bimorph piezoelectric actuator in which two piezoelectric bodies are provided on both sides of the metal sheet.

The vibration presentation unit 16 repeatedly expands and contracts based on, e.g., a drive signal $S_4$ output from the control unit 18 and vibrates the operation surface 120, thereby presenting tactile sensation to the user. This tactile sensation is, e.g., a sense of pushing down a switch in case of a push operation. Meanwhile, tactile sensation presented when passing over the boundary line 105 and tactile sensation indicating that the detection point 121 entered the displayed image as a result of the tracing operation are, e.g., tactile sensation provided by vibrating the operation surface 120 at least once.

(Configuration of the Control Unit 18)

The control unit 18 is, e.g., a microcomputer composed of a CPU performing calculation and processing, etc., of the acquired data according to a stored program, and a RAM and a ROM as semiconductor memories, etc. The ROM stores, e.g., a program for operation of the control unit 18. The RAM is used as, e.g., a storage area for temporarily storing calculation results, etc. The control unit 6 also has, e.g., the touch threshold value 200, the load threshold value 201 and frequency information 202 in a RAM or a ROM.

The touch threshold value 200 is a threshold value for determining whether or not the touch panel 12 has detected a detection target. When capacitance in the capacitance information $S_2$ acquired from the touch panel 12 is not less than the touch threshold value 200, the control unit 18 calculates the detection point 121 upon determination that the detection target has been detected. Then, when the calculated detection point 121 is continuously moving, the control unit 18 determines that a tracing operation is being performed.

The load threshold value 201 is a threshold for determining whether or not a push operation has been performed. When the detection point 121 is calculated and also the detected load is not less than the load threshold value 201, the control unit 18 determines that a push operation has been performed.

The control unit 18 may additionally have a threshold value for a load used for detecting contact of the detection target. In this case, when capacitance of not less than the touch threshold value 200 is detected and a load of not less than the threshold value for load is also detected, the control unit 18 determines that the detection target is in contact with the operation surface 120.

The frequency information 202 is information in which history and frequency of an image selected next after the selected image 102 are associated. The frequency information 202 is generated by, e.g., the control nit 18, but it is not limited thereto. The control unit 18 may acquire the frequency information 202 generated by an external device such as the on-vehicle device 87 that causes the display unit 10 to display an image.

•Prediction of the Next Selected Image 104

The control unit 18 is configured to extract the candidate image(s) 103 based on frequency or history of being selected next after the selected image 102. The control unit 18 in the first embodiment extracts the candidate image(s) 103 according to the frequency based on the frequency information 202, as described above. As a modification, the control unit 18 may be configured to have history information and to extract the candidate image(s) 103 based on history of being selected next.

The control unit 18 is also configured to predict the next selected image 104 from the candidate image(s) 103 based on a direction of the trajectory 110.

FIG. 2A shows a state in which the operating finger 9 after selecting an image (the selected image 102) is moving toward an image as a next object to be selected (the next selected image 104), as an example.

When, e.g., a push operation is performed on an image (the selected image 102) as shown in FIG. 2A, the control unit 18 extracts the candidate image(s) 103 to be selected next, based on the frequency information 202.

In FIG. 2A, four candidate image(s) 103 and the next selected image 104 are extracted. The four candidate image(s) 103 and the next selected image 104 are images that were selected next after the selected image 102 in the past among eight images displayed on the display screen 100 shown in FIG. 2A.

To predict an image to be selected next from the extracted candidate images 103, the control unit 18 predicts a direction of the tracing operation. The trajectory 110 indicated by the dotted line in FIG. 2A is a trajectory obtained by connecting plural calculated detection points 121. Thus, the control unit 18 predicts the direction of the tracing operation based on, e.g., the detection point 121 at which a push operation was performed and also based on the detection points 121 calculated after the push operation.

The direction of the trajectory 110 may be predicted using, e.g., continuous detection points 121, or may be predicted using detection points 121 located at intervals, or may be predicted using plural detection points 121 obtained after the push operation was performed and a predetermined time elapsed, or the direction may be predicted from an average of plural predicted directions, etc., but it is not limited thereto. In the first embodiment, prediction is performed using plural detection points 121 after the push operation was performed and a predetermined time elapsed.

In FIG. 2A, the image 101 exists at a point through which the trajectory 110 passes. This image 101 is, e.g., neither the candidate image 103 nor the next selected image 104, but is an image that has not been selected next after the selected image 102.

When the trajectory 110 reached an image located halfway through the tracing operation in the state in which no image is selected, the control unit 18 presents tactile sensation to the user to notify existence of the image.

However, during the tracing operation after a push operation is performed on the selected image 102, the control unit 18 does not present tactile sensation when passing through the image 101 and presents tactile sensation when reaching the next selected image 104.

This applies even when, e.g., plural boundary lines 105 acting as a trigger for presenting tactile sensation exist between the selected image 102 and the next selected image 104, as shown in FIG. 2B.

Here, when, e.g., the trajectory 110 deviates from the next selected image 104 and the candidate image 103 is located in the deviated direction, the control unit 18 sets this candidate image 103 as the next selected image 104. Meanwhile, when the candidate image 103 is not present in the deviated direction, the control unit 18 presents tactile sensation under normal conditions. The normal conditions are, e.g., conditions for presenting tactile sensation when the trajectory 110 crosses the boundary line 105.

For example, the control unit 18 may periodically calculates the trajectory 110 based on the periodically calculated detection points 121 and determine that the trajectory 110 has deviated from the next selected image 104 when an extended line of the trajectory 110 does not intersects with the next selected image 104. However, other methods may be used for determination.

Next, input of a character string will be described below in reference to FIGS. 3A to 4B.

FIG. 3B and FIG. 3C show an example in which the user inputs the name of a destination to an on-vehicle device 87 as a navigation device, as an example. The display screen 100 for performing this input consists of the images 101 of fifty-sounds from "A" to "N", etc. The image surrounded by a thick solid line frame in FIG. 3B, etc., indicates the selected image 102. Meanwhile, the image surrounded by a thick dotted line frame indicates the candidate image 103.

When the user performs a push operation on the image 101 of "Fu", the control unit 18 extracts character strings input following the "Fu", based on the frequency information 202.

When the extracted character strings are "FuNaBaShi" (frequency: 40%), "FuKuShiMa" (frequency: 30%), "FuChiU" (frequency: 20%) and "FuRaNo" (frequency: 10%) as shown in FIGS. 3A to 3C, the images 101 possibly selected following the selected image 102 of "Fu" are "Na", "Ku", "Chi" and "Ra" and these images 101 are set as the candidate images 103, as an example. When "Fu" and then "Na" are selected, the images 101 which have been selected following "FuNa" are set as the candidate images 103 based on the frequency information 202.

Figure 4A:
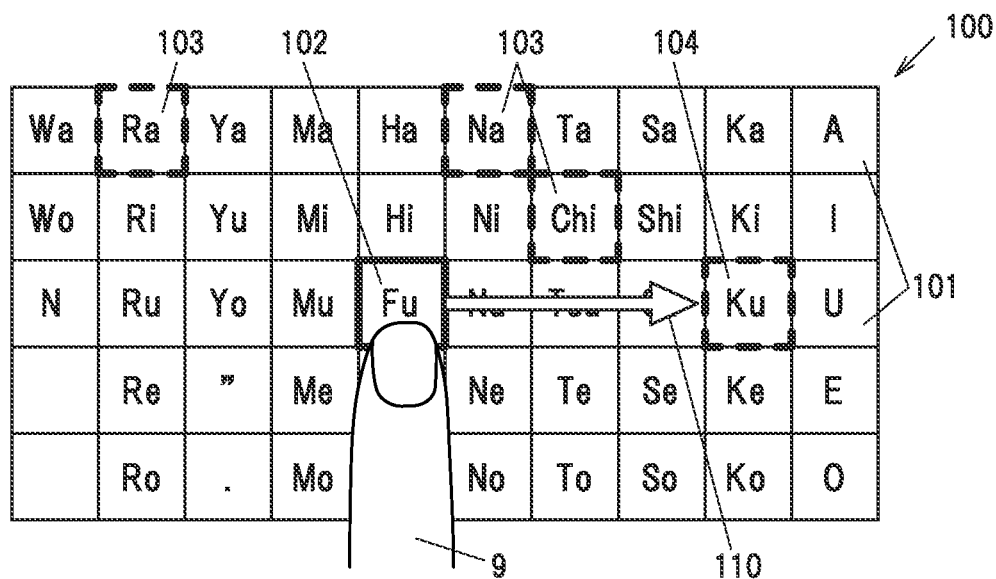
FIG. 4A is an explanatory diagram for explaining a relation between a trajectory and a next selected image that are predicted by a control unit of the tactile sensation presentation device in the first embodiment.

Next, the control unit 18 predicts the direction of the trajectory 110 from movement of the detection point 121 detected by the touch panel 12. In FIG. 4A, an example of the direction of the trajectory 110 predicted from the movement of the detection point 121 is indicated by an arrow.

When the candidate image 103 exists in the predicted direction of the trajectory 110, i.e., exists on the extended line of the trajectory 110, the control unit 18 sets this candidate image 103 as the next selected image 104. In FIG. 4A, "Ku" is set as the next selected image 104.

Figure 4B:
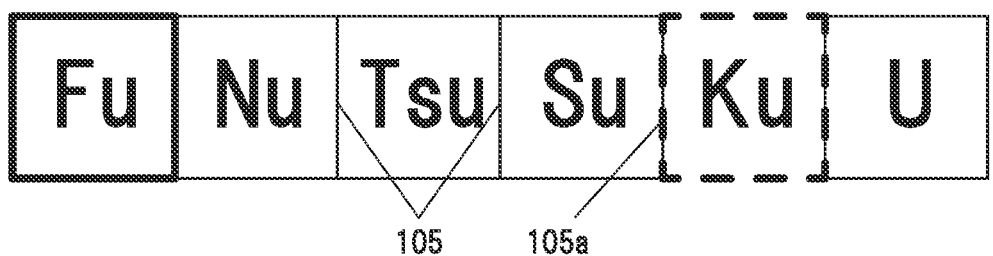
FIG. 4B is a partially enlarged explanatory diagram illustrating boundary lines in FIG. 4A.

The control unit 18 does not present tactile sensation even when the trajectory 110 crosses the boundary line(s) 105 existing between the selected image 102 and the next selected image 104, i.e., even when the operating finger 9 passes through the boundary line 105 by performing the tracing operation. In FIG. 4B, the boundary lines 105 between the images 101 of "Nu", "Tsu" and "Se" are shown as an example. The control unit 18 does not present tactile sensation even when the trajectory 110 of the tracing operation crosses such boundary lines 105.

Then, when the trajectory 110 crosses a boundary line 105*a* between "Su" and "Ku" which is the next selected image 104, the control unit 18 presents tactile sensation. The control unit 18 also presents tactile sensation when a push operation is performed on the next selected image 104.

Here, when, e.g., "Nu", "Tsu", "Su" and "U", etc., which are located in the predicted direction of the trajectory 110, are the candidate images 103, the control unit 18 may set the candidate image 103 having the highest frequency thereamong as the next selected image 104 for which tactile sensation is presented, or may set these candidate images 103 as the next selected images 104 for which tactile sensation is presented.

Next, an example of an operation of the tactile sensation presentation device 1 in the first embodiment will be described in reference to the flowchart of FIG. 5.

(Operation)

When it is "Yes" in Step 1, i.e., when a contact of the operating finger is detected based on the capacitance information $S_2$ acquired from the touch panel 12 and the touch threshold value 200 and a push operation is also detected based on the load information $S_3$ acquired from the load sensor 14 and the load threshold value 201 (Step 1: Yes), the control unit 18 extracts the candidate image(s) 103 based on the push-operated image (the selected image 102) and the frequency information 202 (Step 2).

Next, the control unit 18 predicts the trajectory 110 of the tracing operation from movement of the detection point 121, and predicts the next selected image 104 from the candidate image(s) 103 based on the predicted direction of the trajectory 110 of the tracing operation (Step 3).

Next, the control unit 18 suspends presentation of tactile sensation until the trajectory 110 by the tracing operation reaches the next selected image 104 (Step 4).

Next, when the trajectory 110 reached the next selected image 104, i.e., when the trajectory 110 crosses the boundary line 105a of the next selected image 104 (Step 5: Yes), the control unit 18 outputs the drive signal Sa to the vibration presentation unit 16 and presents tactile sensation (Step 6).

Meanwhile, when the trajectory 110 deviates and does not reach the next selected image 104 (Step 5: No), the control unit 18 presents tactile sensation each time the trajectory 110 crosses the boundary line 105, from the moment when the deviation is determined (Step 7).

Effects of the First Embodiment

The tactile sensation presentation device 1 in the first embodiment can suppress annoyance. In particular, the tactile sensation presentation device 1 does not present tactile sensation when the boundary line 105 acting as a trigger for presenting tactile sensation or the image 101 is present between the selected image 102 and the next selected image 104. Therefore, tactile sensation is not continuously presented and it is possible to suppress annoyance, as compared to when presenting tactile sensation each time the trajectory crosses the boundary line. It is possible to suppress annoyance more remarkably particularly when the user performs a tracing operation quickly, since presentation of tactile sensation at short intervals is suppressed in the tactile sensation presentation device 1.

The tactile sensation presentation device 1 presents tactile sensation as feedback by vibration only when reaching the next selected image 104 that is predicted to be operated by the user. Therefore, as compared to when such a configuration is not adopted, it is possible to suppress annoyance and thereby improve operability.

The tactile sensation presentation device 1 extracts the candidate image(s) 103 according to the frequency and predicts the next selected image 104 from the candidate image(s) 103 based on the direction of the trajectory 110. Therefore, as compared to when such a configuration is not adopted, it is possible to predict the next selected image 104 that is highly likely to be operated next.

Second Embodiment

The second embodiment is different from the first embodiment in that the candidate images with a high frequency are selected and extracted.

In the embodiment described below, portions having the same functions and configurations as those in the first embodiment are denoted by the same reference numerals as those in the first embodiment, and the explanation thereof will be omitted.

The control unit 18 in the second embodiment is configured to extract the candidate image(s) 13 having a high frequency of being selected next after the selected image 102. The control unit 18 extracts the candidate image(s) 13 having a high frequency ranked from the highest to a predetermined level.

As an example, the control unit 18 extracts an image(s) having a frequency ranked from the highest to fifth highest as the candidate image(s) 103, and when the candidate image(s) 103 from the highest to fifth highest, i.e., the next selected image 104 does not exist in the predicted direction of the trajectory 110, the control unit 18 newly extracts an image(s) having a frequency ranked from the sixth or lower level to a given level as the candidate image(s) 103.

The control unit 18 may repeatedly perform extraction of the candidate images 103 until the next selected image 104 comes to exist, or the number of times of extraction or the total number of the extracted candidate image(s) 103 may be preset. When the next selected image 104 does not exist among the candidate images 103, the control unit 18 presents tactile sensation each time the trajectory 110 crosses the boundary line 105.

Figure 6:
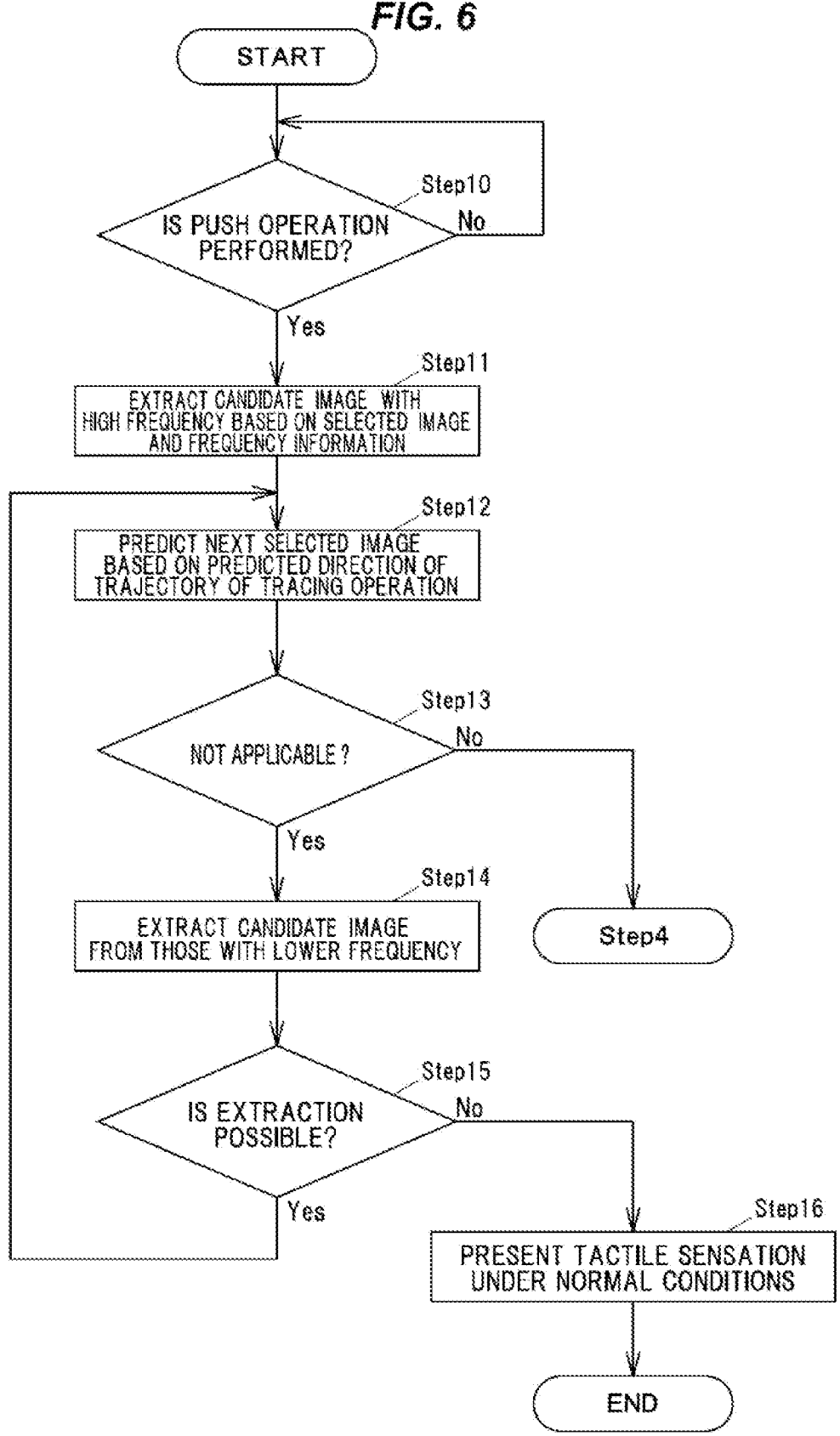
FIG. 6 is an explanatory flowchart showing an operation of the tactile sensation presentation device in the second embodiment.

Next, an operation of the tactile sensation presentation device 1 in the second embodiment will be described in reference to the flowchart of FIG. 6.

(Operation)

When it is "Yes" in Step 10, i.e., when a contact of the operating finger is detected based on the capacitance information $S_2$ acquired from the touch panel 12 and the touch threshold value 200 and a push operation is also detected based on the load information $S_3$ acquired from the load sensor 14 and the load threshold value 201 (Step 10: Yes), the control unit 18 extracts the candidate image(s) 103 based on the push-operated image (the selected image 102) and the frequency information 202 (Step 11). As an example, the control unit 18 extracts the candidate image(s) 103 having a high frequency within the top five.

Next, the control unit 18 predicts the trajectory 110 of the tracing operation from movement of the detection point 121, and predicts the next selected image 104 from the candidate image(s) 103 based on the predicted direction of the trajectory 110 of the tracing operation (Step 12).

Next, when any applicable next selected image 104 does not exist as a result of prediction (Step 13: Yes), the control unit 18 extracts the candidate image(s) 103 based on lower frequency (Step 14).

Next, when it is possible to extract the candidate image(s) 103 (Step 15: Yes), the control unit 18 proceeds the process to Step 12. As an example, when the number of times of extraction or the number of the candidate images 103 is preset as described above and the number exceeds this condition, the control unit 18 determines that extraction is not possible.

Figure 5:
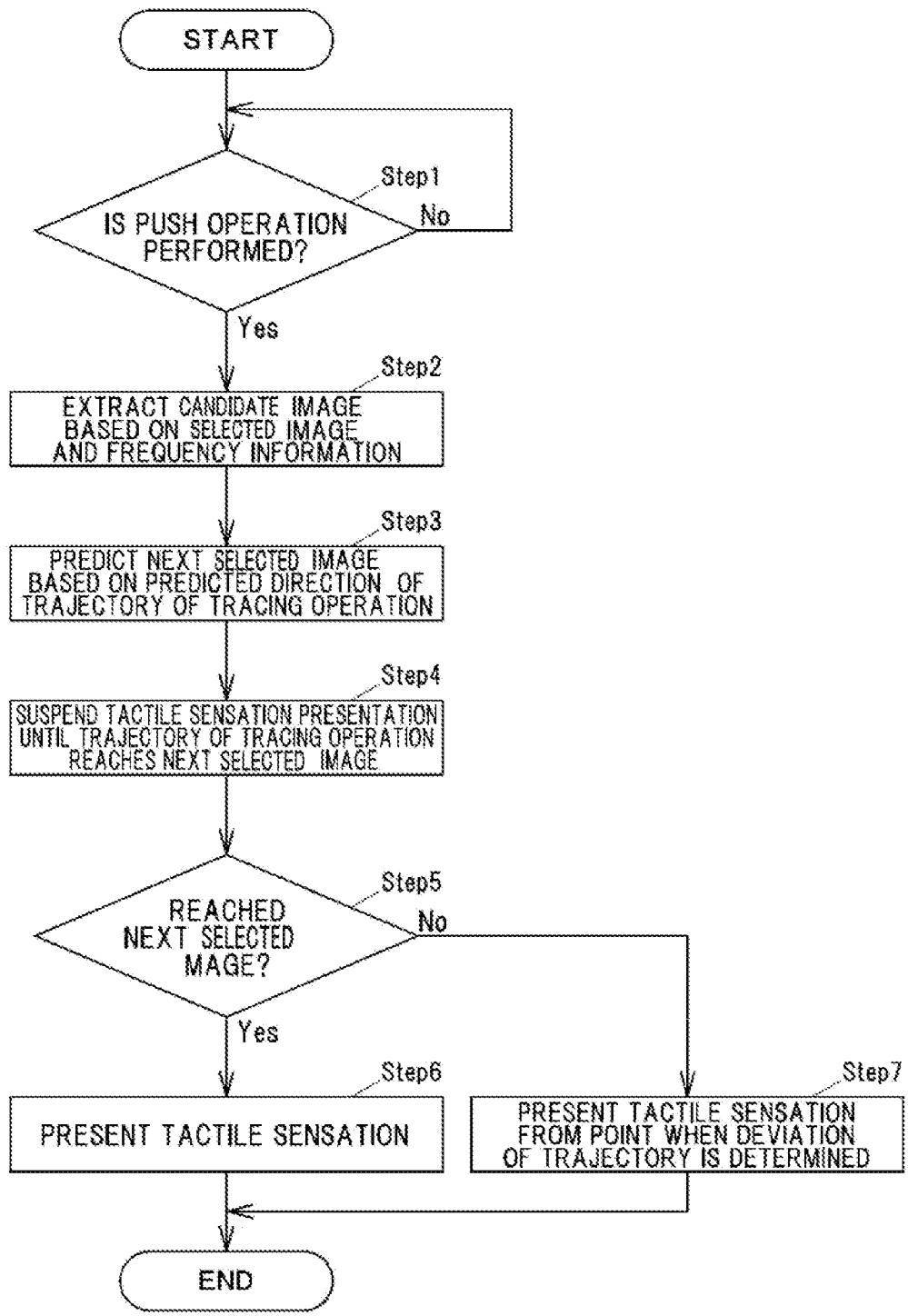
FIG. 5 is an explanatory flowchart showing an operation of the tactile sensation presentation device in the first embodiment

Here, in Step 13, when the next selected image 104 exists (Step 13), the control unit 18 proceeds the process to Step 4 of FIG. 5.

Meanwhile, when it is not possible to extract the candidate image(s) 103 in Step 15 (Step 15: No), the control unit 18 presents tactile sensation under normal conditions (Step 16). The normal conditions are, e.g., conditions for presenting tactile sensation when the trajectory 110 crosses the boundary line 105, as described above.

Effects of the Second Embodiment

The tactile sensation presentation device 1 in the second embodiment predicts the next selected image 104 from the candidate image(s) 103 having a high frequency. Therefore, time until the next selected image 104 is predicted is reduced as compared to when all images which have been selected before are used.

Here, in another embodiment, a program is provided to implement a tactile sensation presentation method including extracting at least one candidate image, which has a probability of being selected next after a selected image, from plural images displayed on a display screen, predicting a next selected image to be selected next from the candidate image(s) based on a trajectory, on the display screen, of a tracing operation performed on an operation surface, not presenting tactile sensation even when the trajectory crosses a boundary line acting as a trigger for presenting tactile sensation if it is between the selected image and the next selected image, and presenting tactile sensation when reaching the next selected image, or a computer-readable storage medium storing such a program is provided.

The tactile sensation presentation device 1 in at least one of the embodiments described above can suppress annoyance.

Some portions of the tactile sensation presentation device 1 in the embodiments and modifications described above may be realized by, e.g., a computer executable program, ASIC (Application Specific Integrated Circuit) and FPGA (Field Programmable Gate Array), etc., according to the intended use.

Although some embodiments and modifications of the invention have been described, these embodiments and modifications are merely examples and the invention according to claims is not to be limited thereto. These new embodiments and modifications may be implemented in various other forms, and various omissions, substitutions and changes, etc., can be made without departing from the gist of the invention. In addition, all combinations of the features described in these embodiments and modifications are not necessary to solve the problem of the invention. Further, these embodiments and modifications are included within the scope and gist of the invention and also within the invention described in the claims and the range of equivalency.

REFERENCE SIGNS LIST

1 TACTILE SENSATION PRESENTATION DEVICE
6 CONTROL UNIT
10 DISPLAY UNIT
12 TOUCH PANEL
16 VIBRATION PRESENTATION UNIT
18 CONTROL UNIT
100 DISPLAY SCREEN
101 IMAGE
102 SELECTED IMAGE
103 CANDIDATE IMAGE
104 NEXT SELECTED IMAGE
105 BOUNDARY LINE
105a BOUNDARY LINE
110 TRAJECTORY
120 OPERATION SURFACE

The invention claimed is:

1. A tactile sensation presentation device, comprising:
a display unit that displays a plurality of images on a display screen;
an operating portion comprising an operation surface on which a touch operation is performed to select one of the plurality of images displayed on the display unit;
a vibration presentation unit that presents tactile sensation by vibrating the operation surface according to the touch operation; and
a control unit that extracts at least one candidate image, which has a probability of being selected next after a selected image selected on the operation surface, from the plurality of images displayed on the display screen, predicts a position of next selected image to be selected next from the candidate image(s) based on a trajectory, on the display screen, of a tracing operation as the touch operation performed on the operation surface, and does not present tactile sensation by the vibration presentation unit even when the trajectory crosses a boundary line acting as a trigger for presenting tactile sensation if the trajectory is between the selected image and the next selected image, and presents tactile sensation by the vibration presentation unit when the trajectory reaches the predicted position of the next selected image,
wherein the predicted trajectory is determined by a movement of a detection point of the touch operation continuously before the trajectory reaches the next selected image, and
wherein the control unit predicts the next selected image from the candidate image(s) based on a direction of the predicted trajectory.

2. The tactile sensation presentation device according to claim 1, wherein the control unit extracts the candidate image(s) based on frequency or history of being selected next after the selected image.

3. The tactile sensation presentation device according to claim 1, wherein the control unit extracts the candidate image(s) having a high frequency of being selected next after the selected image.

4. The tactile sensation presentation device according to claim 1, wherein the control unit extracts the candidate image(s) of which frequency of being selected next after the selected image is from the highest to a predetermined level.

5. The tactile sensation presentation device according to claim 1, wherein, when the direction of the trajectory deviates from the next selected image and the candidate image is located in a deviated direction, the control unit sets the candidate image as the next selected image.

6. The tactile sensation presentation device according to claim 1, wherein, when the direction of the trajectory deviates from the next selected image and the candidate image is not located in the deviated direction, the control unit causes the vibration presentation unit to present tactile sensation when the trajectory crosses the boundary line.

7. The tactile sensation presentation device according to claim 1, wherein the control unit predicts the direction of the trajectory by detecting a plurality of touch positions on the operating portion after a predetermined time elapsed since the selected image was selected.

8. The tactile sensation presentation device according to claim 1, wherein the operating portion comprises a touch panel superimposed on the display unit.

9. A tactile sensation presentation method comprising:
extracting at least one candidate image, which has a probability of being selected next after a selected image, from a plurality of images displayed on a display screen;
predicting a position of next selected image to be selected next from the candidate image(s) based on a trajectory, on the display screen, of a tracing operation performed on an operation surface; and
not presenting tactile sensation even when the trajectory crosses a boundary line acting as a trigger for presenting tactile sensation if the trajectory is between the selected image and the next selected image, and presenting tactile sensation when the trajectory reaches the predicted position of the next selected image,
wherein the predicted trajectory is determined by a movement of a detection point of the touch operation continuously before the trajectory reaches the next selected image, and predicting the next selected image from the candidate image(s) based on a direction of the predicted trajectory.

\* \* \* \* \*